United States Patent
Faure et al.

(10) Patent No.: US 9,872,167 B2
(45) Date of Patent: Jan. 16, 2018

(54) METHOD OF MANAGING SEVERAL PROFILES IN A SECURE ELEMENT

(71) Applicant: GEMALTO SA, Meudon (FR)

(72) Inventors: Frédéric Faure, Gemenos (FR); Xavier Berard, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/117,005

(22) PCT Filed: Jan. 23, 2015

(86) PCT No.: PCT/EP2015/051382
§ 371 (c)(1),
(2) Date: Aug. 5, 2016

(87) PCT Pub. No.: WO2015/124376
PCT Pub. Date: Aug. 27, 2015

(65) Prior Publication Data
US 2017/0171738 A1    Jun. 15, 2017

(30) Foreign Application Priority Data
Feb. 18, 2014 (EP) .................................... 14305224

(51) Int. Cl.
*H04W 8/18*    (2009.01)
*H04W 12/06*   (2009.01)
(Continued)

(52) U.S. Cl.
CPC ........... *H04W 8/183* (2013.01); *H04L 67/306* (2013.01); *H04W 12/06* (2013.01); *H04W 88/06* (2013.01)

(58) Field of Classification Search
CPC ..... H04W 8/183; H04W 12/06; H04W 88/06; H04L 67/306
See application file for complete search history.

(56) References Cited

U.S. PATENT DOCUMENTS

2004/0249915 A1* 12/2004 Russell ................. G01S 5/0252
709/223
2012/0190354 A1* 7/2012 Merrien ................. H04W 4/001
455/422.1
(Continued)

FOREIGN PATENT DOCUMENTS

EP         2 461 613 A1    6/2012
WO    WO 2008/123827 A1  10/2008

OTHER PUBLICATIONS

International Search Report (PCT/ISA/210) issued on May 26, 2015, by the European Patent Office as the International Searching Authority for International Application No. PCT/EP2015/051382.
(Continued)

*Primary Examiner* — Nathan Mitchell
(74) *Attorney, Agent, or Firm* — Buchanan Ingersoll & Rooney PC

(57) ABSTRACT

The invention is a method for managing communication between a secure element and a device. The secure element comprises a physical communication interface and first and second virtual profiles. It is configured to exchange data targeting the virtual profiles with the device through the physical communication interface. The method comprises the steps of:
running simultaneously said first and second virtual profiles,
demultiplex incoming data received through the physical communication interface and multiplex outgoing data sent through the physical communication interface,
resetting one of said virtual profiles individually without affecting the other virtual profiles in response to receiving a specific signal sent by the device through the physical communication interface.

9 Claims, 1 Drawing Sheet

(51) Int. Cl.
   *H04L 29/08*         (2006.01)
   *H04W 88/06*         (2009.01)

(56) References Cited

U.S. PATENT DOCUMENTS

| | | | | |
|---|---|---|---|---|
| 2012/0260095 | A1* | 10/2012 | Von Hauck | H04L 9/3228 713/176 |
| 2013/0023235 | A1* | 1/2013 | Fan | H04W 48/18 455/411 |
| 2013/0344855 | A1* | 12/2013 | Li | H04W 4/16 455/417 |
| 2017/0094628 | A1* | 3/2017 | Miao | H04W 60/005 |

OTHER PUBLICATIONS

Written Opinion (PCT/ISA/237) issued on May 26, 2015, by the European Patent Office as the International Searching Authority for International Application No. PCT/EP2015/051382.

SCP: "Addition of new TLV to indicate the conditions to proceed with REFRESH proactive command;SCP(12)000258r2_CR_102_223_R11_24_Or2_Addition_of_new_TLV_to_indi-cate_the_c", European-Telecommunications Standards Institute (ETSI), Jul. 2013, pp. 1-5, vol. SCP, section 6.4.7.

* cited by examiner

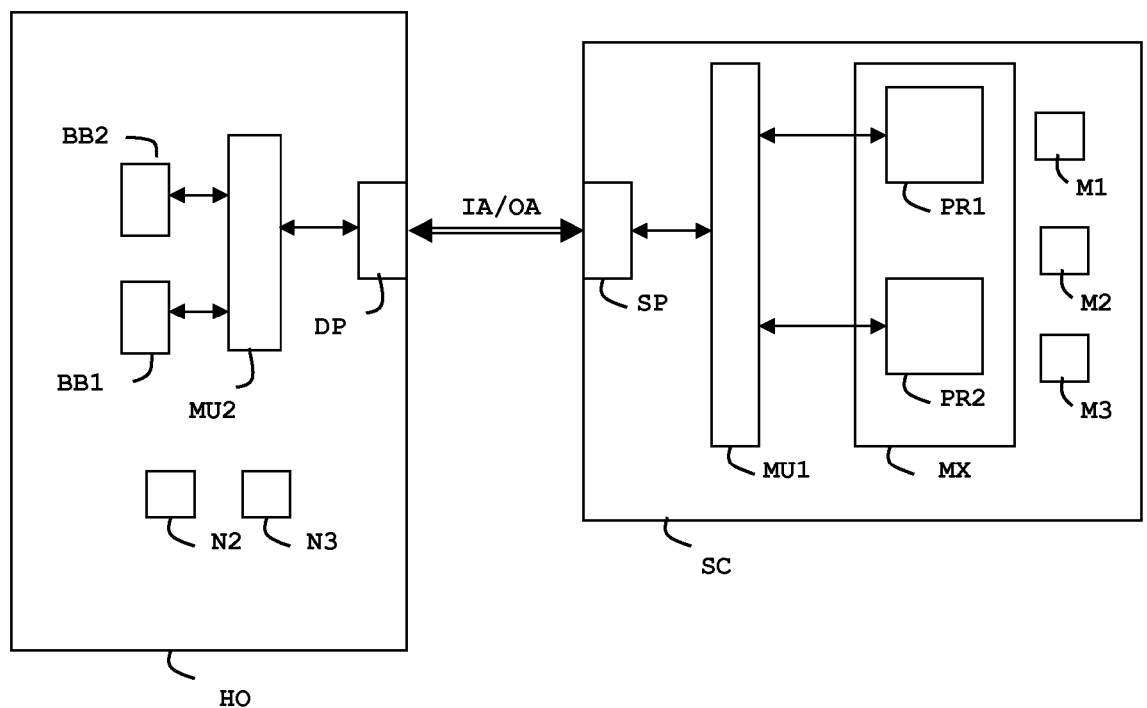

METHOD OF MANAGING SEVERAL PROFILES IN A SECURE ELEMENT

FIELD OF THE INVENTION

The present invention relates to methods of managing several profiles in a secure element. It relates particularly to methods of managing several active profiles in a secure element.

BACKGROUND OF THE INVENTION

A secure element is either a tamper-resistant physical component able to store data and to provide services in a secure manner or a software component providing a trusted storage area and trusted services. In general, a secure element has a limited amount of memory, a processor with limited capabilities and is devoid of battery. For instance a UICC (Universal Integrated Circuit Card) is a secure element which embeds SIM applications for telecommunication purposes. A secure element can be installed, fixedly or not, in a terminal, like a mobile phone for example. In some cases, the terminals are constituted by machines that communicate with other machines for M2M (Machine to Machine) applications.

A secure element can be in the format of a smart card, or may be in any other format such as for example but not limited to a packaged chip as described in PCT/SE2008/050380, or any other format. A UICC can be used in mobile terminals in GSM, CDMA or UMTS networks for instance. The UICC ensures network authentication, integrity and security of all kinds of personal data. The UICC communicates and cooperates with the baseband (also called baseband processor or baseband radio processor) of the terminal equipment.

It is known to solder or weld the secure element in a host device, in order to get it dependent of this host device. This is done in M2M (Machine to Machine) applications. The same objective is reached when a chip (a secure element) containing a Payment application, SIM or USIM applications and files is contained in the host device. The chip is for example soldered to the mother-board of the host device or machine and constitutes an embedded-secure element (eSE).

A secure element may contain a profile which can include a set of applications, a set of personal data and a set of secret data.

The profile could be linked to a subscription. It may contain network access applications (NAA), payment applications or third party applications providing security for a specific service (e.g. NFC applications).

A physical secure element can emulate several virtual secure elements, each one represented as one profile. In such a case, these profiles are called logical profiles or virtual profiles. An emulated profile is hereinafter called virtual profile. Usually each virtual profile is a software based profile.

The invention concerns a way to manage several virtual profiles which are run in a single secure element.

In the state of the art, the basic behaviour to swap a virtual profile to another one is to physically reset the whole secure element (ex: reset as defined by ISO7816-3 standard for a smart card). After this hardware reset, the Operating System of the secure element enables the newly selected virtual profile. Thus only one virtual profile is active at a time in a device session. Moreover, in the swap sequence of the prior art, a proactive Refresh command is sent by the UICC to the host device to request a reboot of the baseband of the host device. The reboot of the baseband allows taking into account the settings of the newly selected virtual profile in the baseband and to reset the UICC. Then, the baseband needs to perform an authentication with the server of the Mobile Network Operator (MNO) to attach to the network. These steps of the swap sequence take a long time during which there is a loss of connectivity between the MNO network and the host device.

There is a need to reduce the duration during which there is a loss of connectivity between the MNO network and the host device.

SUMMARY OF THE INVENTION

An object of the invention is to solve the above mentioned technical problem.

The object of the present invention is a secure element comprising a physical communication interface and first and second virtual profiles. The secure element is configured to exchange data targeting the virtual profiles with a host device connected through the physical communication interface. The host device comprises first and second basebands. The secure element comprises an execution component configured to run simultaneously the first and second virtual profiles. The first virtual profile and the first baseband form a first couple which is uniquely associated with a first logical communication channel. The second virtual profile and the second baseband form a second couple which is uniquely associated with a second logical communication channel distinct from the first logical communication channel. The secure element comprises a communication component configured to demultiplex incoming data received through the physical communication interface and to multiplex outgoing data sent through the physical communication interface. The secure element comprises an admin agent which is configured to reset individually a targeted virtual profile belonging to the couple which is allocated to the logical communication channel through which a specific signal is received by the secure element. The targeted virtual profile is reset without affecting the other virtual profiles.

Advantageously, the secure element may comprise an allocating agent which is configured to define a new couple by uniquely associating one of said virtual profiles with one of the basebands and which is configured to uniquely allocate a logical communication channel to the new couple.

Advantageously, the targeted virtual profile may be reset in response to receiving the specific signal through the physical communication interface.

Another object of the invention is a system comprising a secure element according to the invention and a host device which comprises first and second basebands. The system comprises an allocating agent which is configured to create a new couple by uniquely associating one of said virtual profiles with one of said basebands and which is configured to uniquely allocate a logical communication channel to the new couple.

Advantageously, the system may comprise a preferred couple which is automatically selected in case of reset of the secure element and the system may comprise a setting agent configured to determine and to record what is the preferred couple.

Advantageously, the allocating agent may be configured to uniquely allocate a plurality of logical communication channels to said couple, one of said logical communication channels being dedicated to conveying CAT (Card Application Toolkit) commands only and wherein the secure element is a UICC or a eUICC.

Another object of the invention is a method for managing communication between a secure element and a host device. The secure element comprises a physical communication interface and first and second virtual profiles. The secure element is configured to exchange data targeting the virtual profiles with the host device through the physical communication interface. The method comprises the following steps:

running simultaneously the first and second virtual profiles into the secure element, demultiplex incoming data received through the physical communication interface into the secure element and multiplex outgoing data sent by the secure element through the physical communication interface, resetting one of the virtual profiles individually without affecting the other virtual profiles in response to receiving a specific signal sent by the host device through the physical communication interface.

Advantageously, the host device may comprise first and second basebands and the method may comprise the step of defining a new couple by uniquely associating one of the virtual profiles with one of the basebands and the step of uniquely allocating a logical communication channel to the new couple.

Advantageously, the method may comprise the step of resetting the virtual profiles belonging to the couple which is allocated to logical communication channel through which the specific signal is transmitted.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which:

FIG. 1 is an example of a system comprising a host device and a secure element according to the invention.

DETAILED DESCRIPTION OF THE PREFERRED EMBODIMENTS

The invention may apply to any types of secure element intended to contain several virtual profiles. The secure element may be coupled to any type of host machine able to establish a communication session with the secure element. For example the host machine may be a mobile phone, tablet PC, a vehicle, a meter, a slot machine, a TV or a computer.

FIG. 1 shows a system SY comprising a host device HO and a secure element SC according to the invention.

In this example, the host device HO is a mobile phone having a single hardware communication interfaces DP for communicating with a secure element. The host device HO comprises two basebands BB1 and BB2 which are designed to communicate with secure elements of UICC type. The host device HO comprises a communication component MU2 configured to multiplex messages sent to (and to demultiplex messages received from) the secure element SC through the hardware communication interfaces DP. More specifically, the communication component MU2 is configured to allow basebands BB1 and BB2 to simultaneously communicate with two distinct virtual profiles embedded in the secure element SC.

The secure element SC is an UICC which comprises a communication interface SP and an execution component MX. The execution component MX comprises the virtual profiles PR1 and PR2 and is able to run simultaneously both virtual profiles PR1 and PR2.

Each of the two profiles can be selected to execute a command in each profile without having to perform a reset of the secure element between these commands.

The secure element SC comprises a communication component MU1 placed between the communication interface SP and the virtual profiles PR1 and PR2. The communication component MU1 is configured to demultiplex incoming data IA received through the communication interface SP and to forward the demultiplexed data to the targeted virtual profile. The communication component MU1 is configured to multiplex outgoing data OA provided by the virtual profiles and to send the multiplexed outgoing data through the communication interface SP to the targeted basebands.

For instance, the incoming data IA may be an APDU (Application Protocol Data Unit) command and the outgoing data OA may be an APDU response as specified by ISO7816-4.

In the example of FIG. 1, the host device HO comprises an allocating agent N2 which is configured to create a couple by uniquely associating one virtual profile of the secure element with one of the basebands of the host device HO. This association means that the baseband and the virtual profile of the couple are intended to work together. In addition, the allocating agent N2 is configured to uniquely allocate a logical communication channel to said couple. The logical communication channel may be derived from the ETSI logical channel mechanism. For instance, a specific set of bits may be used to code the reference of the allocated logical communication channel in the CLA byte of the APDU command.

Advantageously, the allocating agent N2 is able to uniquely allocate several logical communication channels to one couple. Thus the virtual profile and the baseband of a couple can communicate using distinct logical communication channels. This feature allows setting a first logical communication channel dedicated to the telecom low layer administration and a second logical communication channel dedicated to applicative treatments.

It should be noted that the logical communication channels may be implemented using the logical channels mechanism defined by ISO7816-4 or using another communication mechanism.

The communication components MU1 and MU2 are configured to take into account the logical communication channel when multiplexing and demultiplexing data. Both the communication components MU1 and MU2 use the logical communication channels for routing the exchanged data to the relevant target.

In the example of FIG. 1, the host device HO comprises a setting agent N3 which is configured to determine and to record what is the preferred couple. The preferred couple is the couple which is used (if possible) when the host device HO is started up. In other words, the preferred couple has the highest priority. For instance the couple BB1/PR1 may be the preferred couple which is enabled at a cold-start of the host device HO.

In another example and assuming that the current couple is different from the preferred couple, the preferred couple may be automatically selected and enabled when the network connection is lost (or goes below a threshold for the received signal strength) with the current couple. This issue may occur due to a lack of network coverage or due to a Telecom network failure. In other words, the preferred couple may be a priority fallback.

The preferred couple corresponds to the preferred communication channel between the host device HO and the secure element SC.

The setting agent N3 is configured to determine the preferred couple based on one or several criteria. These criteria may be the Mobile Network Operator (MNO) associated to a virtual profile, the type of subscription associated to a virtual profile, the communication costs associated to a virtual profile, the current country, a measure of the received signal quality (network coverage) or a choice made by the final user or by the eSE (e.g. during a swap operation initiated by the eSE).

The secure element SC comprises an admin agent M1 which is configured to reset only the virtual profile belonging to the couple which is allocated to logical communication channel through which a specific signal is received by the secure element SC. The admin agent M1 resets the virtual profile individually without affecting the other virtual profiles. In other words, the admin agent M1 is able to reset only a virtual profile so that the others virtual profiles remain continuously enabled.

When the specific signal is the Warm Reset as defined by ISO7816-3, the secure element returns the ATR (Answer-To-Reset) while not performing a real Warm Reset but only performing a reboot of the targeted virtual profile.

Alternatively, the specific signal may be a preset APDU (Application Protocol Data Unit as specified by ISO7816-4) command and the secure element reboots the targeted virtual profile in response to the receipt of this preset APDU command. For instance the preset APDU command may be a Terminal Response command as defined by ETSI TS 102 223. In such a case, the secure element starts the reboot of the targeted virtual profile when it receives the preset APDU command in response to the previously sent proactive Refresh command.

In one example, the secure element is configured to receive from the host device HO an identifier of the targeted virtual profile which is to be reset. In another example, the secure element is configured to determine the targeted virtual profile which is to be reset.

Preferably, the admin agent M1 is distinct from the communication component MU1.

It should be noted that this behavior is different from what exists before the invention. Previously, the reboot of a baseband is triggered by the receipt of a Refresh command. When the Refresh command is set in "UICC Reset" mode as specified in §6.4.7 of the ETSI TS 102 223 V7.6.0, the entire secure element is reset and a new secure element session starts. In such case, all enabled virtual profiles are reset during the phase of reset of the secure element.

According to the invention, it is only the couple (baseband/profile) allocated to the logical communication channel on which the Refresh command is previously transmitted which is rebooted.

In the example of FIG. 1, the secure element SC comprises an allocating agent M2 and a setting agent M3 with are similar to the allocating agent N2 and the setting agent N3 described above.

It should be noted that these allocating agents (M2, N2) and these setting agents (M3, N3) are optional. For example, the couples may be created by another device (like a remote administration server) during an earlier phase.

In a preferred embodiment, the system SY comprises only one allocating agent and one setting agent. The allocating agent may be placed either in the secure element SC or in the host device HO. Similarly, the setting agent may be placed either in the secure element SC or in the host device HO.

According to a first example of the invention, the method for initiating the couples may be performed as follows.

During an initial boot phase of the host device, a command is sent to the secure element to get the list of existing virtual profiles. This list may contain the identifier (AID) of each existing virtual profile with its associated metadata. The allocating agent N2 then identifies which virtual profiles should be used with which virtual profiles. The allocating agent N2 provides each baseband with the AID of its associated virtual profile. Then each baseband selects the appropriate virtual profile according to the following sequence:

a) The baseband opens a logical communication channel which is either determined by the secure element, the host device or preset to a fixed value.
b) The baseband selects the appropriate virtual profile on the logical communication channel thanks to the AID. This step is optional if the communication component MU1 fully manages the routing to the targeted virtual profile.
c) The baseband manages the boot sequence of the virtual profile associated with the logical communication channel by sending the specific signal as described above.

According to a second example of the invention, the method for initiating the couples may be performed as follows.

During an initial boot phase of the host device, a command is sent to the secure element to get the list of the allocated logical communication channels. This list may contain the identifier (ID) of each logical communication channel allocated to each existing virtual profile. Associated metadata may also be included in the list. The allocating agent N2 then identifies which virtual profiles should be used with which virtual profiles. The allocating agent N2 provides each baseband with the ID of its associated logical communication channel. Then each baseband selects the appropriate virtual profile according to the following sequence:

a) The baseband opens the logical communication channel using the provided ID.
b) The baseband manages the boot sequence of the virtual profile associated with the logical communication channel.

Thanks to the invention the couple BB1/PR1 remains enabled and active during the reboot of the baseband BB2. Thus the couple BB1/PR1 continuously provides connectivity for the telecom network.

Thanks to the invention a preferred couple is used for communication while another one is a backup couple which can be used in case of connectivity failure on the preferred couple.

According to an example of the invention, the method for updating the preferred couple may be performed as follows. Note that the wording "preferred communication channel" may be used as an equivalent to the preferred couple.

This example assumes that the baseband BB1 is associated with the virtual profile PR1 and the logical communication channel 1. This couple BB1/PR1 is the preferred couple. This example also assumes that the baseband BB2 is associated with the virtual profile PR2 and the logical communication channel 2. In addition, this example also assumes that the secure element comprises a third virtual profile PR3 (not shown at FIG. 1).

At a first step, the host device requests a swap from the virtual profile PR2 to the virtual profile PR3 via the logical communication channel 2 in order to update the couple BB2/PR2.

A step S2, the secure element performs enablement of virtual profile PR3 and disablement of virtual profile PR2 for the baseband BB2.

At a third step, the secure element sends a Card Application Toolkit (CAT) Refresh command to the baseband BB2 via the logical communication channel 2. In response, the baseband BB2 reboot itself using the settings of the newly selected virtual profile PR3 at fourth step. The baseband BB2 sends the specific signal to the secure element as described above. At a fifth step, the baseband BB2 is attached to the telecom network using the virtual profile PR3.

At a sixth step, the secure element sends a PreferredCommChannel with a parameter equal to "2" indicating that second couple (baseband BB2/virtual profile PR3) becomes the preferred couple for the communication between the host device and the secure element.

Alternatively, the change of preferred couple may be managed by the host device. For instance, the host device may perform an update of the preferred couple as soon as it detects that the baseband BB2 is attached to the telecom network (fifth step).

It should be noted that several couples can communicate in parallel by exchanging data through a common physical interface. Moreover, the preferred virtual profile (e.g. preferred couple) may be changed several times during a single secure element session. In other words, there is no reset of the secure element between several reset of the current virtual profile.

Over-The-Air (OTA) operations may be performed on two virtual profiles simultaneously.

It must be understood, within the scope of the invention, that the above-described embodiments are provided as non-limitative examples. In particular, the secure element may comprise any number of virtual profiles.

The architecture of the host device and the architecture of the secure element shown at FIG. 1 are provided as examples only. These architectures may be different. For example, the allocating agent and the setting agent may be merged as a unique agent.

The invention applies to secure elements of UICC type and embedded-UICC type.

The above described communication interfaces are physical interfaces which may work in either contact mode or in contactless mode.

An advantage of the invention is to allow the installation and the use of a same application which has a unique AID (application identifier) in several virtual profiles identifier.

The invention claimed is:

1. A secure element comprising a physical communication interface and first and second virtual profiles, said secure element being configured to exchange data targeting said virtual profiles with a host device connected through said physical communication interface, said host device comprising first and second basebands, wherein said secure element further comprises an execution component configured to run simultaneously said first and second virtual profiles, a running virtual profile being called enabled, wherein said first virtual profile and said first baseband form a first couple which is uniquely associated with a first logical communication channel, wherein said second virtual profile and said second baseband form a second couple which is uniquely associated with a second logical communication channel distinct from said first logical communication channel, wherein said secure element comprises a communication component configured to demultiplex incoming data received through the physical communication interface and to multiplex outgoing data sent through the physical communication interface and wherein said secure element comprises an admin agent configured to reset individually a targeted virtual profile belonging to the couple which is allocated to the logical communication channel through which a specific signal is received by the secure element, the other virtual profile remaining continuously enabled, and wherein the reset of the targeted virtual profile is performed by rebooting both said targeted virtual profile and the baseband belonging to the same couple as the targeted virtual profile while the other active couple is not rebooted.

2. A secure element according to claim 1, wherein said secure element comprises an allocating agent which is configured to define a new couple by uniquely associating one of said virtual profiles with one of said basebands and which is configured to uniquely allocate a logical communication channel to said new couple.

3. A secure element according to claim 1, wherein the targeted virtual profile is reset in response to receiving the specific signal through the physical communication interface.

4. A system comprising a secure element according to claim 1 and a host device, wherein the host device comprises first and second basebands and wherein said system comprises an allocating agent which is configured to create a couple by uniquely associating one of said virtual profiles with one of said basebands and which is configured to uniquely allocate a logical communication channel to said couple.

5. A system according to claim 4, wherein the system comprises a preferred couple which is automatically selected in case of reset of the secure element and wherein the system comprises a setting agent configured to determine and to record which couple is the preferred couple.

6. A system according to claim 4, wherein the allocating agent is configured to uniquely allocate a plurality of logical communication channels to said couple, one of said logical communication channels being dedicated to conveying CAT commands only and wherein the secure element is a UICC or an eUICC.

7. A system according to claim 4, wherein the host device is able to send a request to swap from an old virtual profile to a new virtual profile in a targeted couple, wherein in response to the receipt of said request, the secure element is configured to perform disablement of the old virtual profile and enablement of the new virtual profile and to send a Card Application Toolkit Refresh command to the baseband of the targeted couple.

8. A method for managing communication between a secure element and a host device comprising first and second basebands, said secure element comprising a physical communication interface and first and second virtual profiles, said secure element being configured to exchange data targeting said virtual profiles with the host device through said physical communication interface, wherein said method comprises the steps:

defining first and second couples by uniquely associating each of said virtual profiles with a respective one of said basebands and uniquely allocating a logical communication channel to each of said couples, running simultaneously said first and second virtual profiles in the secure element, a running virtual profile being called enabled, in the secure element, demultiplexing incoming data received through the physical communication interface and multiplexing outgoing data sent by the secure element through the physical communication interface, in response to receiving a specific signal sent by the host device through the physical communication interface, resetting a targeted virtual profile individually and keeping the other virtual profile continuously enabled, wherein the reset of the targeted virtual profile is performed by rebooting both said targeted virtual profile and the baseband belonging to the same couple as the targeted virtual profile while the other active couple is not rebooted.

9. A method according to claim 8, wherein the method comprises the step of resetting the virtual profiles belonging to the couple which is allocated to a logical communication channel through which the specific signal is transmitted.

* * * * *